(12) United States Patent
Eriksson

(10) Patent No.: US 7,962,786 B2
(45) Date of Patent: Jun. 14, 2011

(54) SECURITY FEATURES IN INTERCONNECT CENTRIC ARCHITECTURES

(75) Inventor: Timo Eriksson, Espoo (FI)

(73) Assignee: Nokia Corporation, Espoo (FI)

( * ) Notice: Subject to any disclaimer, the term of this patent is extended or adjusted under 35 U.S.C. 154(b) by 736 days.

(21) Appl. No.: 11/601,880

(22) Filed: Nov. 17, 2006

(65) Prior Publication Data
US 2008/0120520 A1 May 22, 2008

(51) Int. Cl.
G06F 11/00 (2006.01)

(52) U.S. Cl. ......................................................... 714/24

(58) Field of Classification Search .................... 714/37, 714/24; 713/310, 324
See application file for complete search history.

(56) References Cited

U.S. PATENT DOCUMENTS

| | | | |
|---|---|---|---|
| 6,128,746 A * | 10/2000 | Clark et al. .................. 713/324 |
| 6,507,731 B1 * | 1/2003 | Hasegawa .................. 455/115.3 |
| 6,633,947 B1 * | 10/2003 | Holman et al. .................. 711/5 |
| 7,137,020 B2 * | 11/2006 | Gilstrap et al. .............. 713/324 |
| 2002/0108064 A1 * | 8/2002 | Nunally ........................ 713/300 |
| 2003/0212923 A1 * | 11/2003 | Coppock et al. ................ 714/24 |
| 2004/0148482 A1 * | 7/2004 | Grundy et al. ................ 711/167 |
| 2004/0148548 A1 * | 7/2004 | Moyer et al. .................... 714/25 |
| 2005/0064829 A1 | 3/2005 | Kang et al. |
| 2005/0078620 A1 * | 4/2005 | Balachandran et al. ....... 370/313 |
| 2005/0154933 A1 * | 7/2005 | Hsu et al. ...................... 713/320 |
| 2005/0204176 A1 * | 9/2005 | Togawa ......................... 713/320 |
| 2006/0285579 A1 * | 12/2006 | Rhee et al. ..................... 375/132 |
| 2007/0049317 A1 * | 3/2007 | Qi et al. ......................... 455/522 |
| 2008/0144670 A1 * | 6/2008 | Goossens et al. ............. 370/503 |
| 2008/0215786 A1 * | 9/2008 | Goossens et al. ............. 710/243 |
| 2009/0313592 A1 * | 12/2009 | Murali et al. ..................... 716/6 |

FOREIGN PATENT DOCUMENTS

| | | |
|---|---|---|
| EP | 1328066 | 7/2003 |
| EP | 1619572 | 1/2006 |
| GB | 2423606 | 8/2006 |

OTHER PUBLICATIONS

MIPI Alliance System Power Management (SPM) Architectural Framework White Paper, Version 1.0; 2005 MIPI Alliance, Inc.; Retrieved from the Internet Jan. 14, 2008—http://www.mipi.org/docs/mipi-spm-framework-wp-2005.pdf; Figures 1-3, chapters 6.1-6.3, 8, 9.1, 10.2, and 10.3 (pp. 19-20, 22, 27 and 29-30).

* cited by examiner

Primary Examiner — Scott T Baderman
Assistant Examiner — Yair Leibovich
(74) Attorney, Agent, or Firm — Alfred A. Fressola; Ware, Fressola, Van Der Sluys & Adolphson LLP

(57) ABSTRACT

A method comprising: detecting a sub-system to be controlled in a reduced resource mode in a device having an interconnecting system architecture; sending a resource reducing request to an interconnect node of the sub-system, the interconnect node belonging to a first power/clock signal domain; and reducing resources of processing elements of the sub-system belonging to a second power/clock signal domain.

20 Claims, 3 Drawing Sheets

SECURITY FEATURES IN INTERCONNECT CENTRIC ARCHITECTURES

FIELD OF THE INVENTION

The present invention relates to interconnect centric device architectures, and more particularly to security features therein.

BACKGROUND OF THE INVENTION

A traditional way of designing and implementing various data processing devices has been based on a centralised application engine. That is, a data processing device typically comprises a central processing unit (CPU), which may consist of one or more processors, and other parts and subunits of the computing system, like the memories, display adapters, I/O adapters, mass storages, graphics accelerators, etc., which are connected to the CPU via one or more system buses. The CPU then controls the operation of the whole computing system by delivering operation command to the subunits and by processing and transferring data to and from the subunits.

However, data processing devices, especially portable devices, like mobile terminals and PDA devices, are becoming increasingly complex, thanks to their colour screens, onboard digital cameras, high-speed microprocessors, etc. Therefore, it seems evident that future device platform architectures will be based on an interconnect centric approach where multiple intelligent sub-systems communicate directly with each other, and not through central application engine as today. For that purpose, many device manufacturers and sub-unit vendors have started co-operation to develop interconnect centric platform, wherein the interfaces between the subunits are standardized to the necessary extent such that the various subunits from different vendors can automatically communicate with each other. One such co-operation project is known as MIPI (Mobile Industry Processor Interface) Alliance.

Even though the interfaces between the subunits are quite strictly defined and standardized, the subunits and sub-systems, as such, can internally use any technologies favoured by the requirements and competences. Accordingly, the device manufacturer who assembles the final product from a plurality of interconnecting subunits and sub-systems, does not necessarily have any knowledge about the internal implementation of the subunits. Consequently, this black-box approach causes new security threats to the device.

It is possible that one or more sub-systems start malfunctioning due to an error (bug) in the software or hardware implementation, due to accidental or deliberate misuse, or due to deliberate hostile attack resulting from downloaded Trojan virus, for example. A faulty sub-system may, for example, flood power or signals to the interconnect system thereby disturbing other sub-system communication and wasting energy or causing high peak powers possibly leading to shutting down the device. A faulty sub-system may also misuse services and cause financial losses to an end-user, as well as steal end-user's confidential information.

Apparently, there is a need for an arrangement for handling a malfunctioning sub-system in an interconnecting system architecture.

SUMMARY OF THE INVENTION

Now there is invented an improved method and technical equipment implementing the method, by which it is possible to blacklist a malfunctioning or a power consuming sub-system from the device interconnect. Various aspects of the invention include a method, an apparatus and modules, which are characterized by what is stated in the independent claims. Various embodiments of the invention are disclosed in the dependent claims.

According to a first aspect, a method according to the invention is based on the idea of detecting a sub-system to be controlled in a reduced resource mode, e.g. a malfunctioning or a power consuming sub-system, in a device having an interconnecting system architecture. Then a resource reducing request is sent to an interconnect node of the sub-system, said interconnect node belonging to a first power/clock signal domain, and the resources of processing elements of the sub-system belonging to a second power/clock signal domain are reduced.

According to an embodiment, the resource reducing is carried out according to at least one of the following processes:
shutting down the processing elements of the sub-system belonging to the second power/clock signal domain;
reducing the maximum power available for the processing elements of the sub-system belonging to the second power/clock signal domain;
reducing the interconnect throughput available for the processing elements of the sub-system belonging to the second power/clock signal domain.

According to an embodiment, the sub-system to be controlled in a reduced resource mode further comprises: a controller for controlling the resource reducing of the processing elements belonging to the second power/clock signal domain; the method further comprising: sending a dedicated control signal from the interconnect node of the sub-system to the controller to enable the resource reducing of the processing elements.

According to an embodiment, the sub-system to be controlled in the reduced resource mode is a malfunctioning sub-system or a sub-system having lost its integrity.

According to an embodiment, the method further comprises: detecting a loss of integrity of a sub-system on the basis of an integrity check number or an alarm received from the sub-system.

According to an embodiment, the method further comprises: detecting a malfunctioning sub-system on the basis of power usage or interconnect misbehaviour.

According to an embodiment, a sub-system in the reduced resource mode is woken up by checking, in response to the malfunctioning or the loss of integrity being recovered, validity of a boot-up image of the malfunctioning or the integrity failing sub-system; sending a resource reducing removal request to the interconnect node of the malfunctioning or the integrity failing sub-system; disabling the dedicated control signal to remove the reduced resource mode of the sub-system; and activating the power and clock signals for the processing elements belonging to the second power/clock signal domain.

The arrangement according to the invention provides significant advantages. A major advantage is that the presented approach makes interconnect centric modular device architectures highly secure against many types of sub-system malfunctions. If the operating voltage of the sub-system processing elements is switched off, when a malfunction is noticed, the approach is highly secure against any misuse, because it is practically impossible by programmable means to take over a sub-system. However, the device operation, at least in a limited mode, is still available in most cases, even though one sub-system was switched off. For example, if an imaging sub-system of mobile terminal fails, the user can still make emergency calls without any problems. A further significant advantage is that the approach of switching off the power is very energy efficient, since no malfunction or misuse can cause significant waste of energy or disturbing energy peaks. On the other hand, if the detected malfunction of a sub-system is less severe, it is possible to implement the reduced resource mode as a reduced performance of the power source, for example, whereby a complete shutdown of the sub-system is not required, but the blacklisted sub-system can still continue to operate, however with reduced resources.

Furthermore, a power saving mode may also be implemented in accordance with the approach.

According to a second aspect, there is provided an apparatus comprising: a managing sub-system comprising a security manager for monitoring the operation of the apparatus having an interconnecting system architecture; one or more non-managing subsystems, said non-managing sub-systems comprising a first power/clock signal domain including an interconnect node and at least a second power/clock signal domain including one or more processing elements of the sub-system; wherein the security manager is arranged to detect a sub-system to be controlled in a reduced resource mode and send a resource reducing request to an interconnect node of the sub-system, and the interconnect node of the sub-system to be controlled in a reduced resource mode is arranged to reduce the resources of the processing elements belonging to the second power/clock signal domain.

These and other aspects of the invention and the embodiments related thereto will become apparent in view of the detailed disclosure of the embodiments further below.

DESCRIPTION OF THE DRAWINGS

In the following, various embodiments of the invention will be described in more detail with reference to the appended drawings, in which.

DESCRIPTION OF EMBODIMENTS

Figure 1:
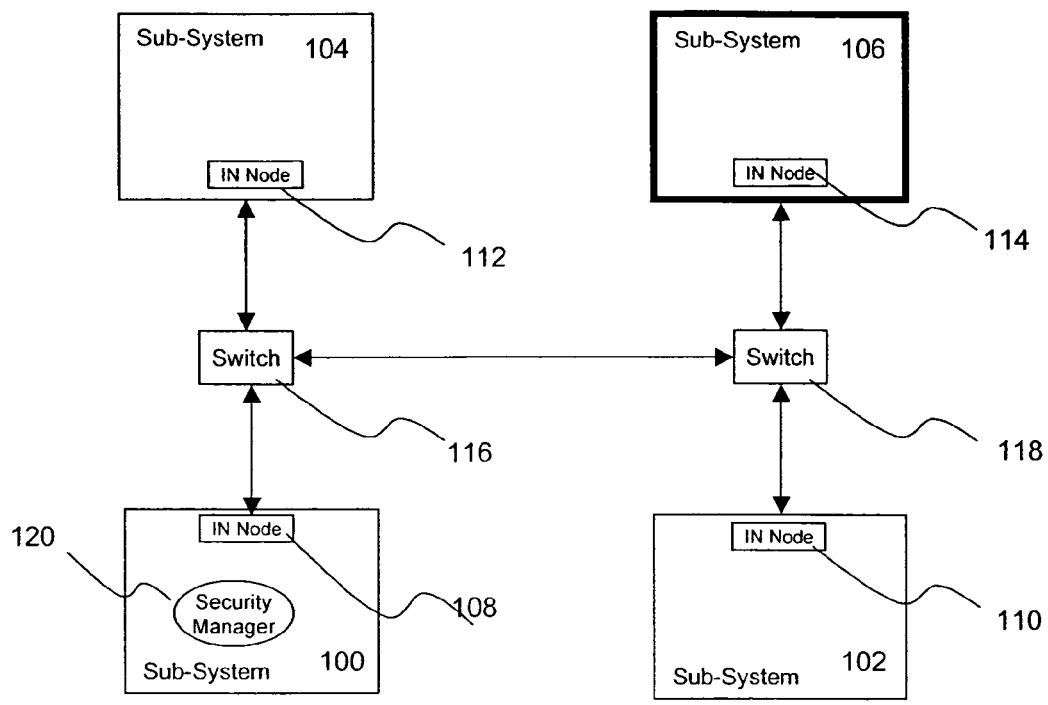
FIG. 1 shows a simplified block chart of a top-level view of an interconnecting system architecture consisting of four sub-systems.

FIG. 1 shows a simplified block chart of a top-level view of an interconnecting system architecture consisting of four sub-systems 100, 102, 104, 106. One or more of the sub-systems may comprise a processor or an application processor, i.e. a microprocessor based system-on-a-chip (SoC) which runs applications in the device. These processors or SoCs are typically interfaced to a variety of peripherals, such as displays, cameras, memories, mass storages, graphics accelerators, or communication units. A processor typically runs an OS (Operating System) independently of the other processors in the device. The OS, in turn, provides the processors with an execution environment and a scheduler for the operations. Typically the OS uses the MMU (Memory Management Unit).

In an interconnect centric system architecture, the hardware interfaces between the sub-systems comprising e.g. processor chips, memories, accelerators and the external peripheral chips are standardized to the necessary extent. Thus, hardware products from multiple vendors can be smoothly interfaced with sub-system products from other vendors. Since software is an integral component of many of these interfaces, an interconnect centric system architecture typically also includes extensive level of software standardization to enhance the inter-connectivity. Software provides the basic means to implement high-level sub-system services. These services are of black-box type and hide the underlying complexities of the sub-system low-level software and hardware resources. These services are the main means for other sub-systems to utilize the resources of the sub-system implementing the mentioned services.

These standardized interfaces are accessed via an Interconnect Node (IN) 108, 110, 112, 114 included in each sub-system. Each sub-system and its Interconnect Node are identified by their own Interconnect Address (IA). The interconnect system architecture further comprises Interconnect Switches 116, 118 for directing operation commands and data to the corresponding sub-systems according to the used Interconnect Address. At least one of the sub-systems comprises a Security Manager 120, which is responsible for monitoring the other sub-systems and taking actions in case one or more of the sub-systems are malfunctioning or fail an integrity check. The other sub-systems may preferably provide the Security manager periodically with an integrity check number, i.e. a hash, whereby the monitoring may be based on the correctness of the received hash. Additionally, a sub-system may send an event-based alarm to the Security Manager informing it has internally detected change in the hash. It is also possible that a sub-system malfunctions without the integrity being changed. In these cases, the malfunction may be detected from misbehaviour in the power usage and/or in interconnect traffic.

Now, for the case that the received hash is faulty, i.e. it indicates that the original image (being either software—SW—or hardware—HW—or both) of the sub-system has changed, the Interconnect Node 108 located in the sub-system 100 running the Security Manager 120 comprises, in accordance with an embodiment, special management features enabling sending a resource reducing request to the sub-system having lost its integrity. This feature should not be accessible in any non-management specialized sub-system, but possibly in another managing sub-system, i.e. the interconnect system architecture may comprise a plurality of management specialized sub-systems, whereby the management functionalities are at least duplicated in order to raise the fault tolerance even higher.

Figure 2:
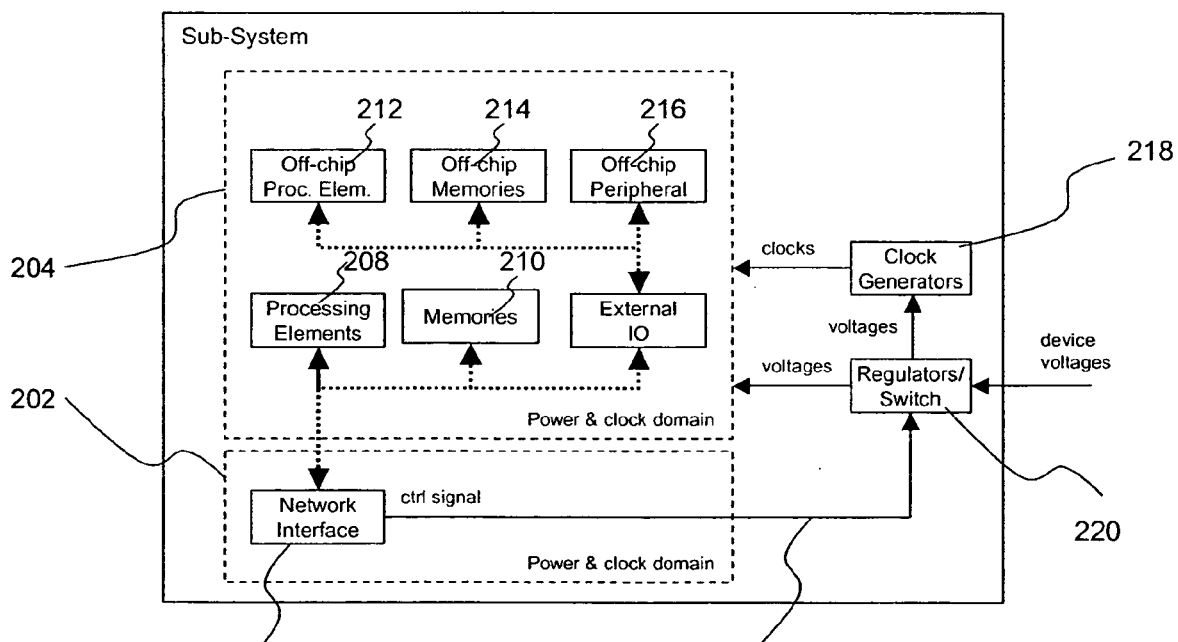
FIG. 2 shows a sub-system's internal architecture according to an embodiment of the invention.

FIG. 2 illustrates the internal implementation of a sub-system according to an embodiment. The operation is based on a structure, wherein the sub-system Interconnect Node 200 belongs to a first power/clock domain 202 and the rest of the sub-system processing elements belong to a second power/clock domain 204. Separate power/clock domains enable keeping the Interconnect Node 200 alive for assisting in the process of shutting down the rest of the sub-system, if decided by the Security Manager e.g. due to malfunctioning or lost integrity. Now when the sub-system running the Security Manager (sub-system 100 in FIG. 1) notices a faulty sub-system, it sends a resource reducing request to that sub-system via the control network of the device. The Interconnect Node 200 receives the resource reducing request and sets a dedicated control signal 206 that enables to control the voltages and clock signals of the sub-system. The first power/clock domain 202 for the Interconnect Node 200 is kept alive and possibly controlled using power mode support. Thus, the resource reducing does not affect this domain.

On the contrary, all sub-system processing elements—both on-chip processing elements 208 and memories 210 and off-chip processing elements 212, memories 214 and peripherals 216—belong to the second power/clock domain 204, which is affected by the resource reducing. The second power/clock domain 204 is connected to local clock generator 218 and power regulator 220 (acting as a controller), which are controlled by the dedicated control signal 206 received from the Interconnect Node 200. In response to receiving the dedicated control signal, the local clock generator 218 and power regulator 220 are switched off, or in case the detected malfunctioning is less severe, the available power can be reduced, for example. Alternatively, if external voltages and clock signal generators are used, then switching off the signals may be carried out by a simple local switch, which is controlled according to the dedicated control signal. As a further alternative, each sub-system may have dedicated regulated power domains, whereby the shutdown switch could also locate in the same sub-system as the energy source/power distribution.

It should be noted that even though shutting down a blacklisted sub-system is the primary countermeasure to be taken, it is also possible to implement the reduced resource mode with some less severe action, as mentioned above. Thus, the reduced resource mode may also include a reduced performance of the local clock generator 218 or the power regulator 220, or a limited throughput to the other sub-systems. These options do not necessitate a complete shutdown of the sub-system, but the blacklisted sub-system can still continue to operate, however with reduced resources. Nevertheless, for the sake of clarity, the embodiments disclosed herein are mainly illustrated by using the shutdown as an example of the reduced resource mode.

According to an embodiment, the above procedure can be extended to implement a power saving mode in a device using the interconnect system architecture. Thus, the power saving mode can be automated for example such that, if during the use of a particular application, such as a telephone application, the available power e.g. in terms of battery charge level drops below a predetermined threshold value, then sub-systems unnecessary for the use of the particular application will be switched off. There may be a predetermined order, according to which the unnecessary sub-systems are switched off, whereby depending on the power consumption of the used application, it may not be necessary to switch off all unused sub-systems. Preferably, prior to controlling any sub-system in the reduced resource mode, it is checked that the sub-system is not handling any service request, i.e. it is not used by any client.

Regardless whether a sub-system was switched off due to malfunction, loss of integrity or the power saving purpose, a wakeup of a switched-off sub-system can preferably be carried out in opposite order. Once the malfunctioning is recovered, e.g. the faulty sub-system element is repaired or a virus causing the malfunction is removed, a boot-up image for the sub-system is checked. After assuring that the boot-up image is valid, the Security Manager instructs the Interconnect Node to disable the dedicated control signal, whereby the blacklisting is removed and the sub-system Interconnect Node activates the power and clocks for the processing elements. Then the sub-system boots up into a valid state.

A skilled man appreciates that any of the embodiments described above may be implemented as a combination with one or more of the other embodiments, unless there is explicitly or implicitly stated that certain embodiments are only alternatives to each other.

Altogether, the approach presented above makes interconnect centric modular device architectures highly secure against many types of sub-system malfunctions. Since the operating voltage of the sub-system processing elements is switched off, when a malfunction is noticed, the approach is highly secure against any misuse, because it is practically impossible by programmable means to take over a sub-system. However, the device operation, at least in a limited mode, is still available in most cases, even though one or more sub-systems were switched off. For example, if an imaging sub-system of mobile terminal fails, the user can still make emergency calls without any problems.

Furthermore, the approach of switching off the power is very energy efficient, since no malfunction or misuse can cause significant waste of energy or disturbing energy peaks. This also goes within the guidelines of the energy-power architecture with local power regulation, which has been commonly planned for distributed architectures. The energy efficiency is further underlined by the fact that the implementation of the above system is very simple.

Figure 3:
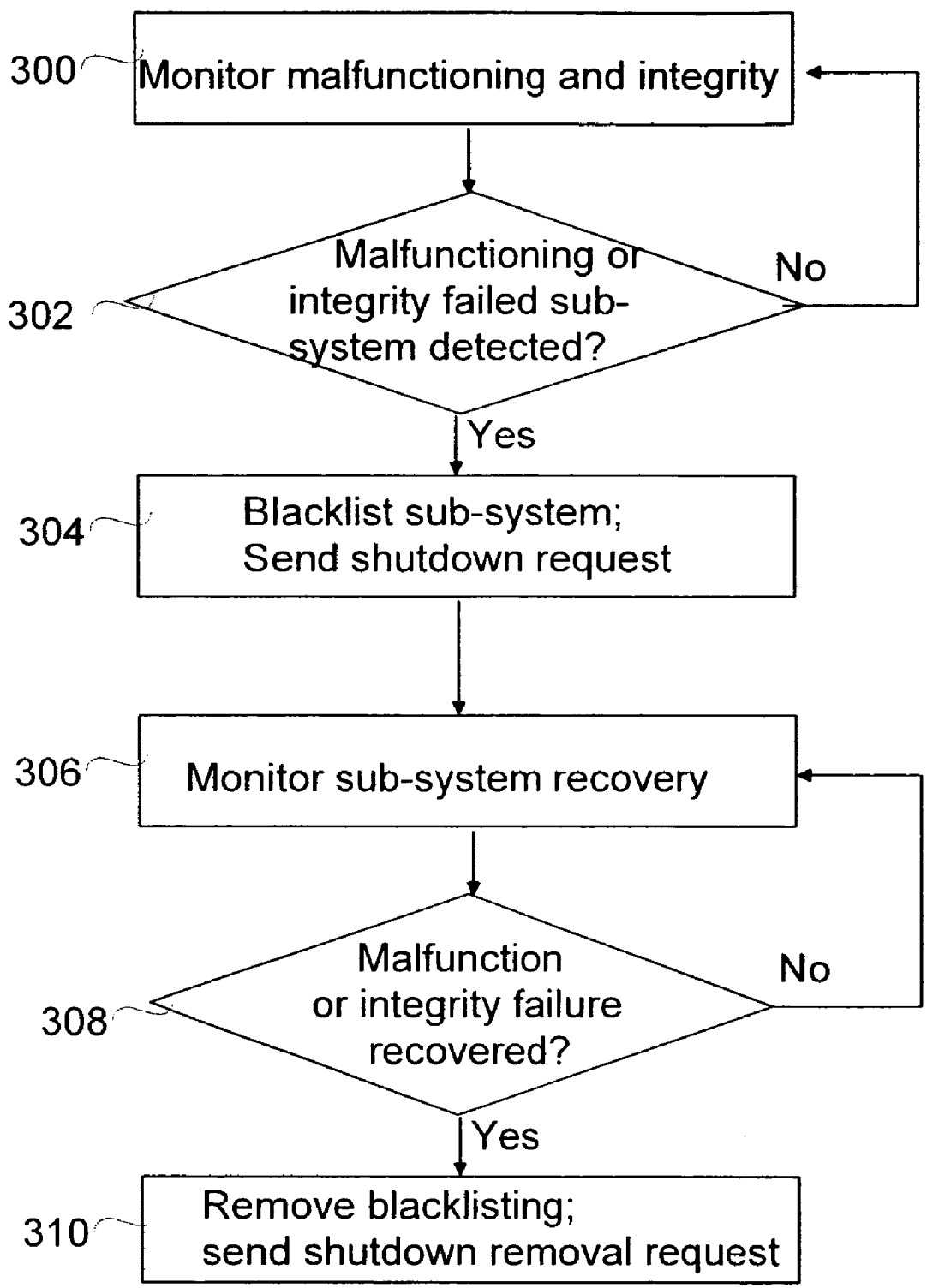
FIG. 3 shows a flow chart of the operation of a security manager according to an embodiment of the invention.

The above procedure of handling blacklisting in the Security Manager is further illustrated in the flow chart of FIG. 3. The Device Security Manager monitors (300) regularly the status of the sub-systems belonging to the interconnect system architecture. Additionally, the sub-systems may send alarms to the Security Manager informing about the loss of integrity or a self-detection of a malfunction. If a malfunctioning sub-system is detected (302), then the Device Security Manager sends (304) a shutdown request via its Interconnect Node to the Interconnect Address of the malfunctioning sub-system. However, if no malfunctioning sub-system is detected (302), then the monitoring (300) is continued.

If at least one malfunctioning sub-system is detected and shutdown, the Device Security Manager continues to monitor (306) regularly the status of the shutdown sub-systems. If the Device Security Manager notices (308) that at least one malfunctioning or integrity failed sub-system is recovered, then the Device Security Manager removes the blacklisting of the particular sub-system and sends a shutdown removal request via its Interconnect Node to the Interconnect Address of the recovered sub-system (310). But again, if no recovered sub-system is detected (308), then the monitoring (306) is continued.

Figure 4:
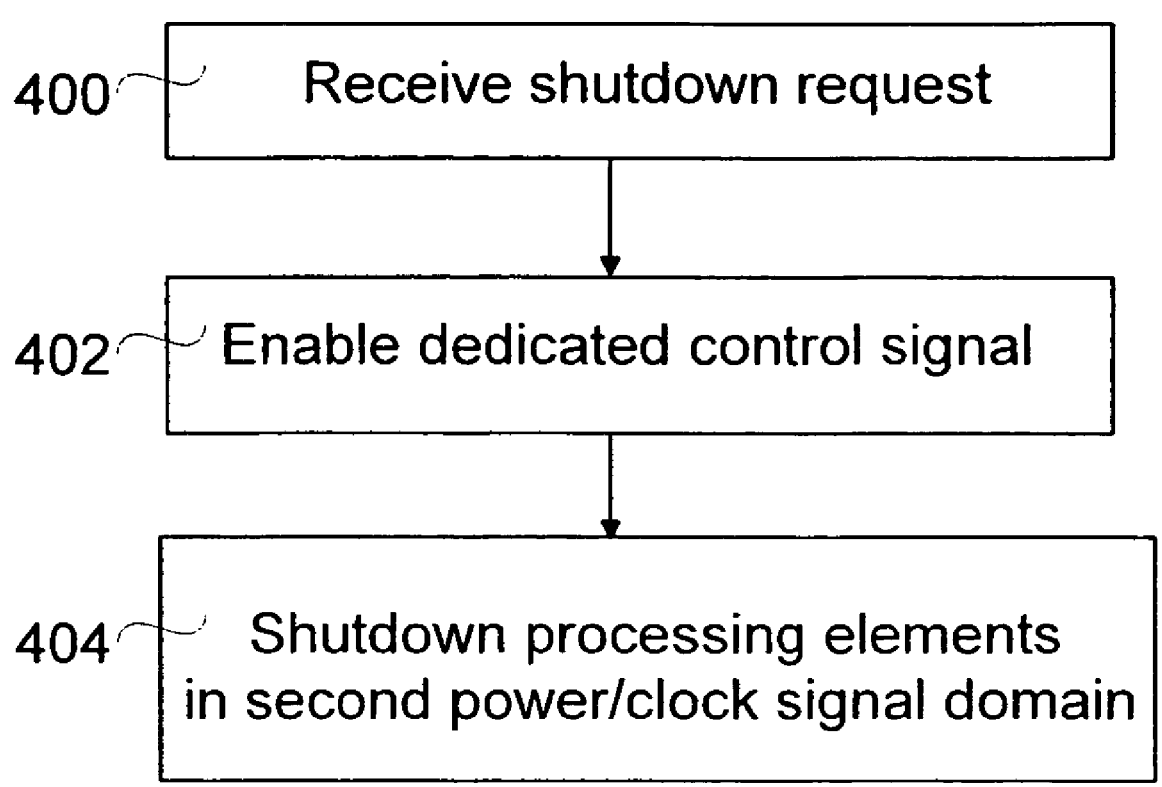
FIG. 4 shows a flow chart of the operation of a malfunctioning sub-system according to another embodiment of the invention.

The flow chart of FIG. 4 illustrates the shutdown process in a malfunctioning sub-system. The Interconnect Node of the malfunctioning sub-system receives (400) the shutdown request from the Device Security Manager. As a response, the Interconnect Node enables (402) the dedicated control signal, which controls the sub-system internal regulators (or switch) to force a power shutdown (404) of the domains having the processing elements. Only the Interconnect Node is kept alive for receiving a subsequent shutdown recovery request.

The sub-systems can be implemented in a data processing device having an interconnect centric modular architecture as an integral part of the device, i.e. the sub-system is implemented as an embedded structure, however having the interfaces required for the interconnect modular architecture. However, it is apparent from the basic idea of interconnect centric modular architecture that the sub-systems may as well be implemented as a separate module, which comprises the sub-system specific functionalities and the required interfaces and which is attachable to various kinds of data processing devices. The sub-system specific functionalities may be implemented as a chipset, i.e. an integrated circuit and a necessary connecting means for connecting the integrated circuit to the rest of the interconnect modular architecture. Furthermore, the peripherals are also considered being part of sub-system internal architecture.

The data processing devices, wherein the embodiments are applicable, may preferably comprise any kind of data processing devices implementing an interconnect centric modular architecture. The advantages of energy efficiency are apparent especially in portable devices, like mobile terminals and PDA devices, but the above-mentioned advantages are similarly achieved in desktop data processing devices, like in desktop/laptop PCs.

It is apparent that the present invention is not limited solely to the above-presented embodiments, but it can be modified within the scope of the appended claims.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
   detecting an intelligent sub-system to be controlled in a reduced resource mode in an interconnecting centric system architecture including a plurality of intelligent sub-systems, each having an interconnect node, the interconnecting centric system architecture having an interconnect centric approach wherein multiple intelligent sub-systems communicate directly with each other and not through a central application engine;
   receiving a resource reducing request at an interconnect node of the detected sub-system, said interconnect node belonging to a first power/clock signal domain; and
   reducing resources of processing elements of the detected sub-system belonging to a second power/clock signal domain.

2. The method according to claim 1 further comprising:
   sending a dedicated control signal from the interconnect node of the detected sub-system to a controller of the sub-system to be controlled in the reduced resource mode, for controlling the resource reducing of the processing elements belonging to the second power/clock signal domain, said control signal enabling the resource reducing of the processing elements.

3. The method according to claim 1, wherein
   the sub-system to be controlled in the reduced resource mode is a malfunctioning sub-system or a sub-system having lost its integrity.

4. The method according to claim 3, further comprising:
   detecting the loss of integrity of a sub-system on the basis of an integrity check number or an alarm received from the sub-system.

5. The method according to claim 3, further comprising:
   detecting a malfunctioning sub-system on the basis of power usage and/or interconnect misbehaviour.

6. The method according to claim 3, further comprising:
   checking, in response to the malfunctioning or the loss of integrity being recovered, validity of a boot-up image of the malfunctioning or the integrity failing sub-system;
   sending a resource reducing removal request to the interconnect node of the malfunctioning or the integrity failing sub-system;
   disabling the dedicated control signal to remove the reduced resource mode of the sub-system; and
   activating the power and clock signals for the processing elements belonging to the second power/clock signal domain.

7. The method according to claim 1, wherein the resource reducing is carried out according to at least one of the following processes:
   shutting down the processing elements of the sub-system belonging to the second power/clock signal domain;
   reducing the maximum power available for the processing elements of the sub-system belonging to the second power/clock signal domain;
   reducing the interconnect throughput available for the processing elements of the sub-system belonging to the second power/clock signal domain.

8. An apparatus comprising:
   a managing sub-system comprising a security manager configured to monitor the operation of the apparatus having an interconnecting centric system architecture, the interconnecting centric system architecture having an interconnect centric approach wherein multiple intelligent sub-systems communicate directly with each other and not through a central application engine;
   one or more non-managing subsystems of said interconnecting centric system, said non-managing sub-systems comprising a first power/clock signal domain including an interconnect node and at least a second power/clock signal domain including one or more processing elements of the sub-system;
   wherein the security manager is configured to detect a sub-system to be controlled in a reduced resource mode and send a resource reducing request to an interconnect node of the sub-system, and
   the interconnect node of the sub-system to be controlled in a reduced resource mode is configured to reduce the resources of the processing elements belonging to the second power/clock signal domain.

9. The apparatus according to claim 8, the non-managing sub-systems further comprising:
   a controller configured to control the resource reducing of the processing elements belonging to the second power/clock signal domain; wherein
   the interconnect node of the sub-system to be controlled in a reduced resource mode is configured to send a dedicated control signal to said controller to enable the resource reducing of the processing elements.

10. The apparatus according to claim 9, wherein the controller comprises a local clock generator and a power generator.

11. The apparatus according to claim 9, further comprising an external clock generator and power generator; wherein the controller comprises a local switch.

12. The apparatus according to claim 8, wherein the processing elements belonging to the second power/clock signal domain comprise at least one of the following:
 on-chip processing elements and/or memories;
 off-chip processing elements, memories and/or peripherals.

13. The apparatus according to claim 8, wherein the sub-system to be controlled in the reduced resource mode is a malfunctioning sub-system or a sub-system having lost its integrity.

14. The apparatus according to claim 13, wherein the security manager is configured to detect the loss of integrity of a sub-system on the basis of an integrity check number or an alarm received from the sub-system.

15. The apparatus according to claim 13, wherein the security manager is configured to detect a malfunctioning sub-system on the basis of power usage and/or interconnect misbehaviour.

16. The apparatus according to claim 13, wherein
 the security manager is configured, in response to the malfunctioning or the loss of integrity being recovered, to check validity of a boot-up image of the malfunctioning or the integrity failing sub-system and to send a resource reducing removal request to the interconnect node of the malfunctioning or the integrity failing sub-system; and
 the interconnect node of the malfunctioning sub-system is configured to disable the dedicated control signal to remove the reduced resource mode and to activate the power and clock signals for the processing elements belonging to the second power/clock signal domain.

17. The apparatus according to claim 8, wherein the resource reducing mode includes at least one of the following processes:
 shutting down the processing elements of the sub-system belonging to the second power/clock signal domain;
 reducing the maximum power available for the processing elements of the sub-system belonging to the second power/clock signal domain;
 reducing the interconnect throughput available for the processing elements of the sub-system belonging to the second power/clock signal domain.

18. A module, attachable to a data processing device, comprising a non-managing subsystem for an interconnecting centric system architecture including a plurality of intelligent sub-systems, each having an interconnect node, the interconnecting centric system architecture having an interconnect centric approach wherein multiple intelligent sub-systems communicate directly with each other and not through a central application engine, said non-managing sub-system comprising a first power/clock signal domain including an interconnect node and at least a second power/clock signal domain including one or more processing elements of the sub-system;
 wherein the interconnect node of the sub-system is configured to receive a resource reducing request and to control the processing elements belonging to the second power/clock signal domain in a reduced resource mode.

19. The module according to claim 18, wherein:
the module is implemented as a chipset.

20. An apparatus comprising:
 a managing sub-system comprising means for monitoring the operation of the apparatus having an interconnecting centric system architecture including a plurality of intelligent sub-systems, each having an interconnect node, the interconnecting centric system architecture having an interconnect centric approach wherein multiple intelligent sub-systems communicate directly with each other and not through a central application engine;
 one or more non-managing subsystems, said non-managing sub-systems comprising a first power/clock signal domain including an interconnect node and at least a second power/clock signal domain including one or more processing elements of the sub-system;
 wherein the means for monitoring is arranged for detecting a sub-system to be controlled in a reduced resource mode and for sending a resource reducing request to an interconnect node of the sub-system, and
 the interconnect node of the sub-system to be controlled in a reduced resource mode is configured to reduce the resources of the processing elements belonging to the second power/clock signal domain.

\* \* \* \* \*